United States Patent [19]

Wike, Jr. et al.

[11] Patent Number: 5,105,070
[45] Date of Patent: Apr. 14, 1992

[54] BAR CODE SCANNING APPARATUS WITH ROTATING HOUSING MEMBER

[75] Inventors: Charles K. Wike, Jr.; Joseph M. Lindacher, both of Cambridge, Ohio; Jonathan D. Bassett, Ithaca, N.Y.

[73] Assignee: NCR Corporation, Dayton, Ohio

[21] Appl. No.: 625,257

[22] Filed: Dec. 10, 1990

[51] Int. Cl.⁵ .............................................. G06K 7/10
[52] U.S. Cl. .................................. 235/467; 235/470; 235/472; 359/212
[58] Field of Search .............. 235/462, 467, 470, 472; 350/6.5, 6.6

[56] References Cited

U.S. PATENT DOCUMENTS 3,087,373  4/1963  Poor et al. ................. 350/6.6 X
4,766,297  8/1988  McMillan ................... 235/462 X Primary Examiner—David Trafton
Attorney, Agent, or Firm—Richard W. Lavin

[57] ABSTRACT

A portable bar code scanner includes a support member and a housing member rotatably mounted on the support member and having a pair of sloping supporting surfaces oriented at an angle to each other and a floor portion on which is mounted a reflecting mirror. One or both of the sloping supporting surfaces may include a transparent substrate. A source of scanning light beams such as a hand-held scanner is mounted adjacent the other sloping supporting surface for projecting a plurality of scanning light beams in the form of a scan pattern at the reflecting mirror which reflects the scan pattern onto the transparent substrate over which a bar code label is passed enabling the scanning light beams to scan the bar code label. The housing member may be rotated up to one hundred and eighty degrees to position the transparent substrate in a number of scanning positions.

15 Claims, 6 Drawing Sheets

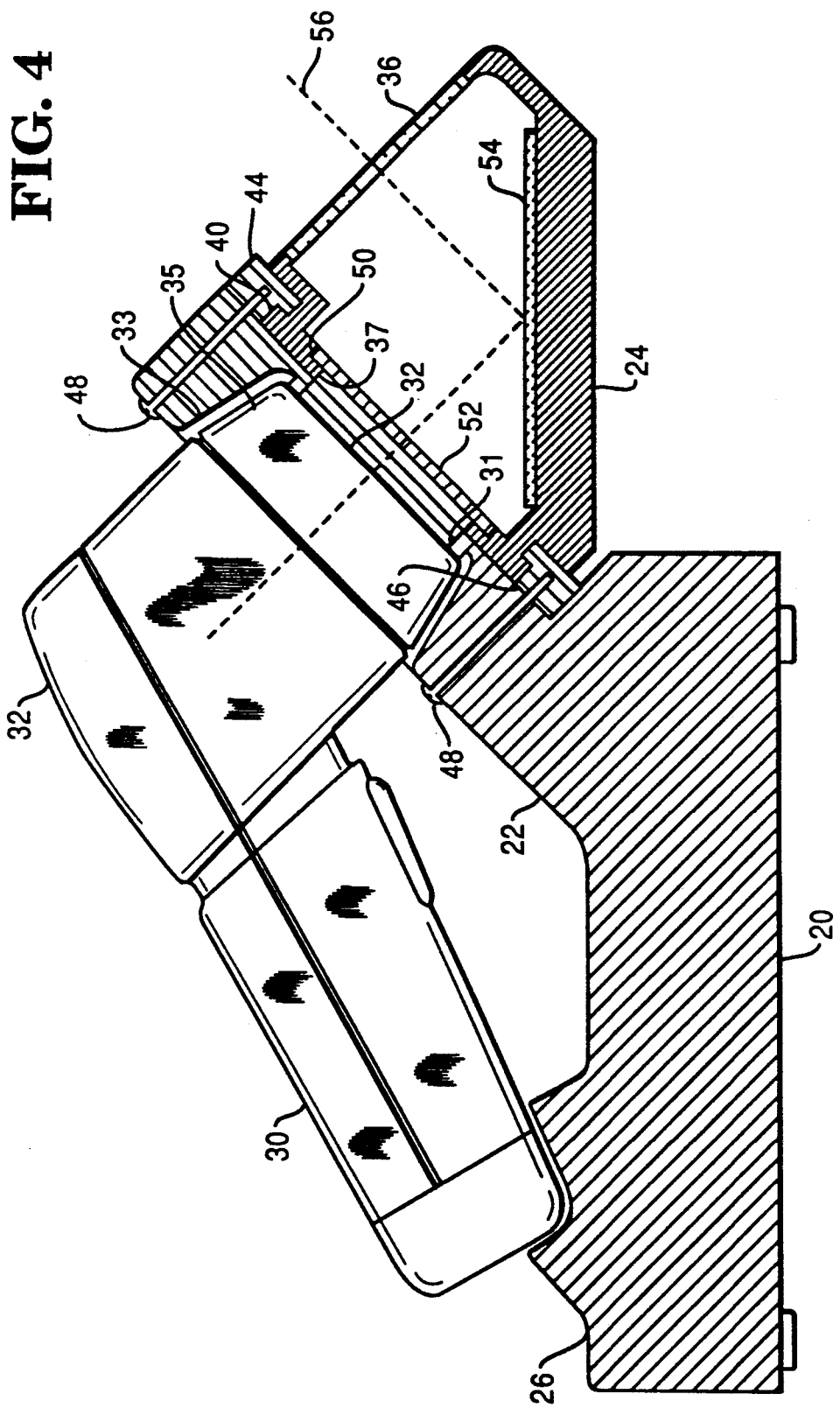

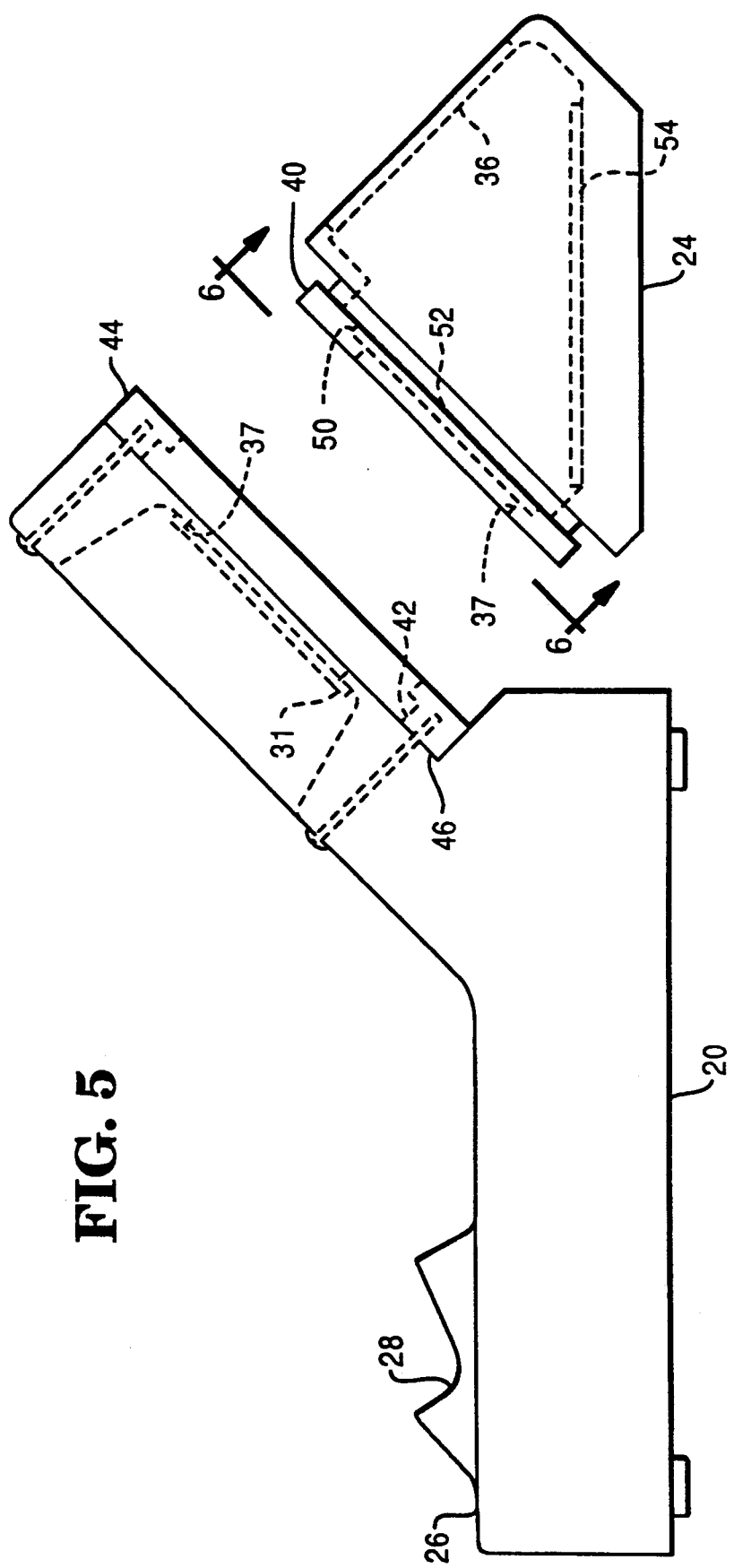

BAR CODE SCANNING APPARATUS WITH ROTATING HOUSING MEMBER

CROSS REFERENCE TO RELATED APPLICATION

Bar Code Scanning Apparatus co-pending application Ser. No. 625,331, filed Dec. 10, 1990, invented by Park Doing, Donald W. Carr and Charles K. Wike, Jr., assigned to the NCR Corp.

BACKGROUND OF THE INVENTION

The present invention relates to optical bar code scanning systems and more particularly to a portable bar code scanning device in which a bar code label is moved across a transparent surface on which is projected a scanning pattern for scanning the bar code label during a merchandise checkout operation.

In present-day merchandising point-of-sale operations, data pertaining to the purchase of a merchandise item is obtained by reading data encoded indicia such as a bar code label printed on or attached to the merchandise item. In order to standardize the bar codes used in various point-of-sales checkout systems, the grocery industry has adopted a uniform product code (UPC) which is in the form of a bar code. Reading systems which have been constructed to read this type of bar code include hand-held optical scanners which are moved across the bar code and stationary optical scanners normally located within the cabinet structure of a checkout counter in which the bar code is read when a purchased merchandise item is moved across a window constituting the scanning area of the counter, which movement is part of the process of loading the item into a baggage cart. Hand-held scanners emit a single scan line which is directed over the bar code by the operator while the stationary optical scanners emit a multiline scan pattern through which the bar code label is moved, enabling a higher throughput of scanning bar code labels to occur over that of hand-held scanners. Where the merchandise consists of soft materials such as clothing or other types of soft materials, hand-held scanners have been employed to read the bar code labels attached to the material in which the bar code label is manually positioned adjacent the hand-held scanner. It has been found that this type of scanning operation has been ineffective in many cases because the bar code label was not positioned within the depth of field of the scanner or that the projected scan pattern was not properly positioned on the bar code label. Because of this, there has arisen a need for a portable scanning device which can be moved to a plurality of positions within the business establishment allowing a hands free scanning operation to occur. An example of this type of scanning device may be found in the above cited NCR patent application Ser. No. 625,331. One drawback of this type of scanning device is that the scanning aperture is oriented in only one direction which, in some installations, was found to limit the scanning operation due to limited counter-space at the checkout station.

The background art known to the applicants at the time of the filing of this application includes U.S. Pat. No. 4,369,361 which discloses a portable stand-alone desk-top laser scanning workstation including a laser scanning head mounted above a support base facing the operator in which objects bearing bar code symbols to be scanned are passed under the scanning head, and U.S. Pat. No. 4,766,297 which discloses a support member for supporting a portable hand-held scanning device in which the support member includes structure for sensing the presence of an object between the scanning head portion and the base portion of the support member and for automatically initiating a reading of a bar code symbol by the portable hand-held scanning device each time the sensing structure senses the presence of an object.

SUMMARY OF THE INVENTION

A portable bar code scanning system is provided which comprises a housing member including first and second opposed exterior sloping surfaces in which are mounted transparent substrates and which further includes a mirror member mounted on the floor of the housing member between the sloping surfaces. The housing member is rotatably mounted on a support member having a third sloping surface parallel to and located adjacent the first exterior sloping surface for supporting a hand-held bar code scanning device. The scanning head portion of the scanning device is positioned within a recessed portion in the third sloping surface in the support member which communicates with the transparent substrate in the first exterior sloping surface. Upon operation of the bar code scanner, light beams forming an optical scanning pattern are projected from the bar code scanner through the recessed portion in the third sloping surface in the support member, through the transparent substrate in the first exterior sloping surface and towards the mirror member which reflects the scanning pattern onto the transparent substrate mounted in the second sloping surface for scanning a bar code label positioned adjacent the substrate in the second exterior sloping surface to complete a scanning operation of the bar code label. Where the situation requires it, the housing member can be rotated about the support member to position the second sloping surface to allow a scanning operation to occur on either side of the scanning device.

It is therefore a principal object of this invention to provide a portable optical bar code scanning apparatus having a scanning aperture which can be positioned to allow for hands free scanning of a bar code label in a plurality of scanning positions.

It is another object of this invention to provide a bar code scanner which is light weight and accommodates a hand-held scanner as the source of scanning light beams.

It is another object of this invention to provide a portable bar code scanning device which is simple in construction and therefore low in cost.

BRIEF DESCRIPTION OF THE DRAWINGS

These and other objects, features and advantages of the invention, as well as the invention itself, will become more apparent to those skilled in the art and in light of the following detailed description taken in consideration with the accompanying drawings wherein like reference numerals indicate like or corresponding parts throughout the several views and wherein:

FIG. 4 is a sectional view taken on line 4—4 of FIG. 3;

FIG. 5 is a side partial exploded view of the portable bar code scanning apparatus of the present invention;

DESCRIPTION OF THE PREFERRED EMBODIMENT

Figure 1:
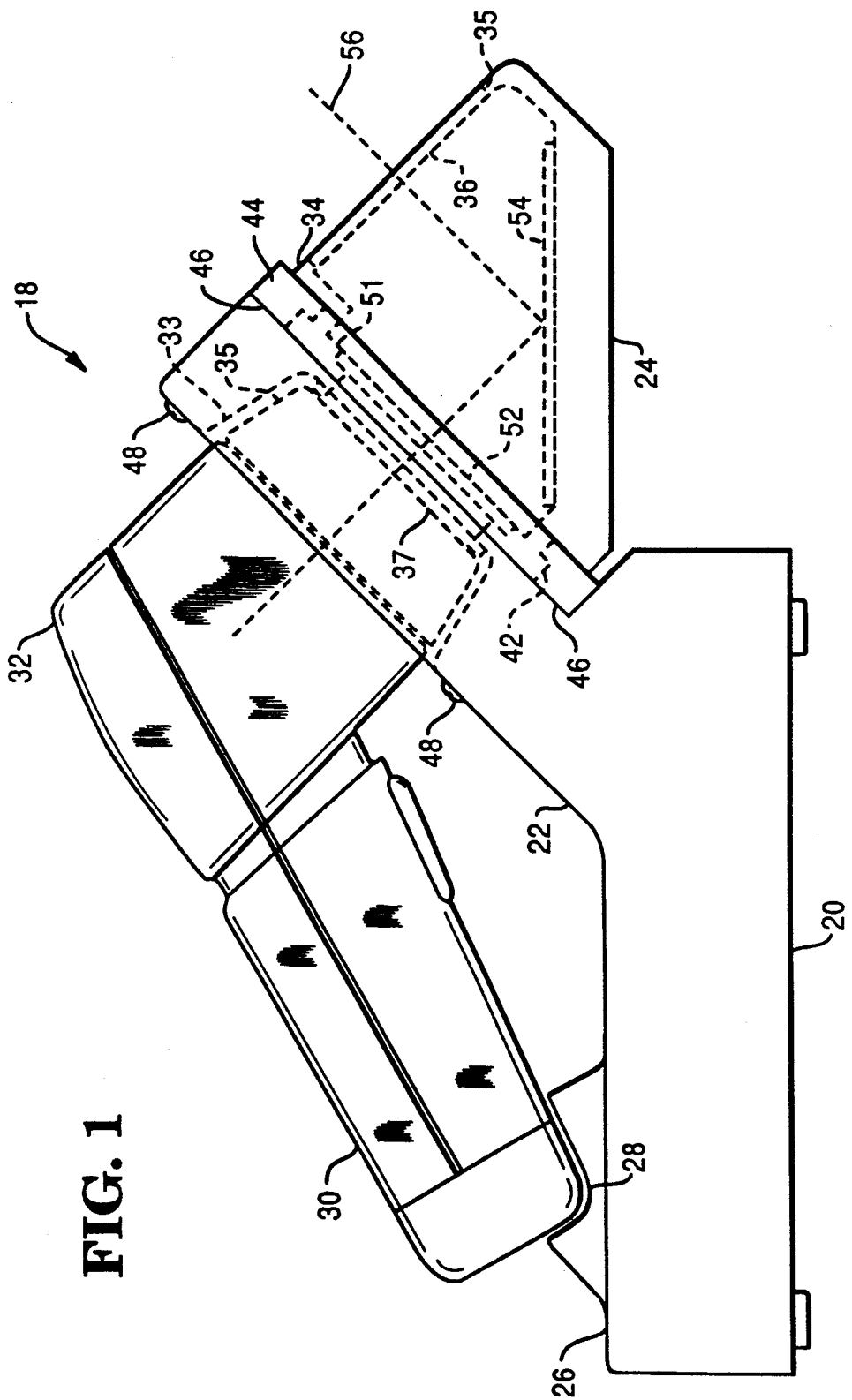
FIG. 1 is a side view of the portable optical bar code scanning apparatus of the present invention showing the location of the hand-held scanner on the support member and the housing member on the support member with the housing member orientated in a forward direction.
Figure 2:
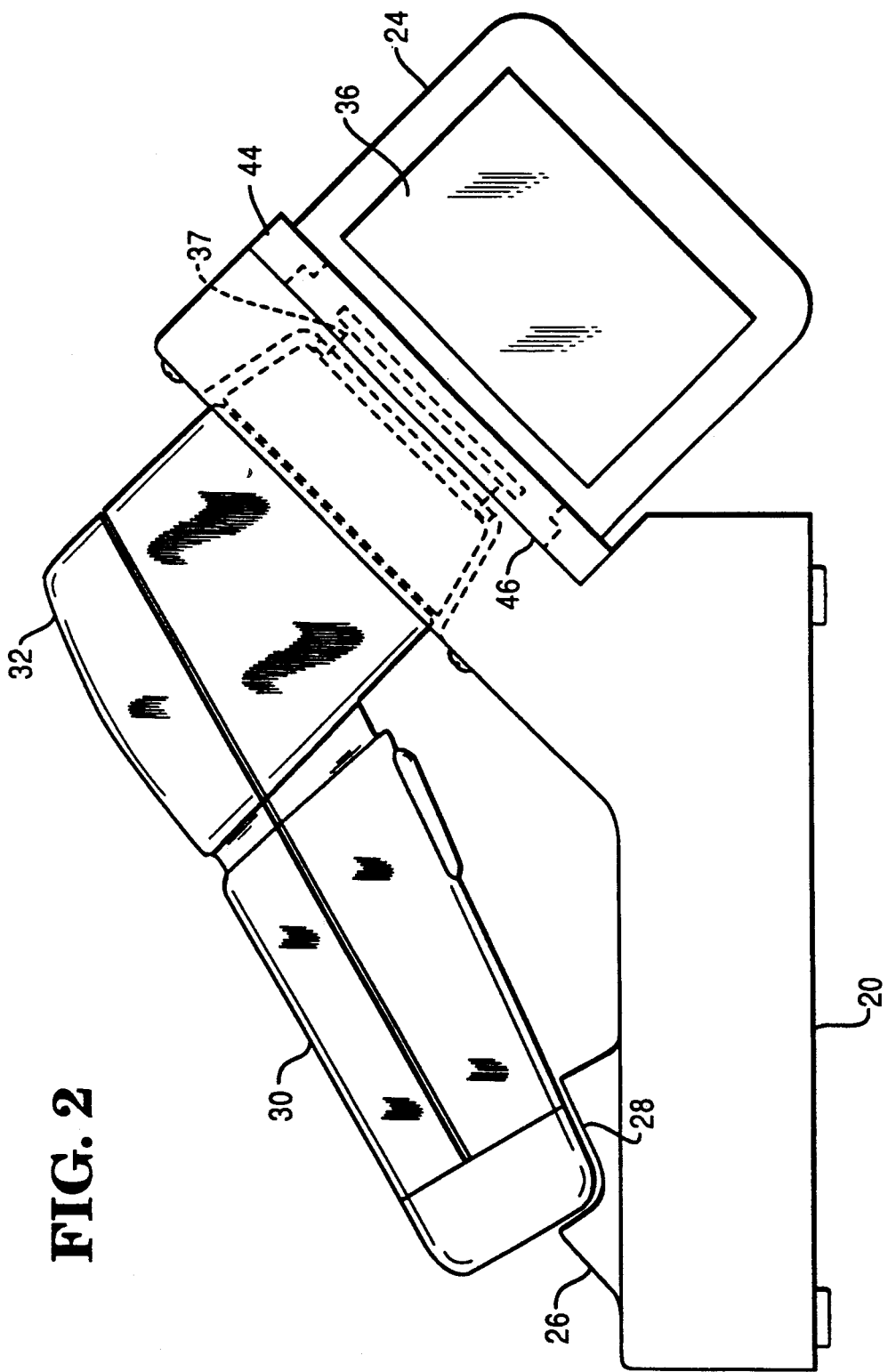
FIG. 2 is a side view of the portable bar code scanning apparatus of the present invention which is similar to FIG. 1 showing the housing member rotated ninety degrees enabling a scanning operation to occur on the side of the scanning apparatus.

Referring now to FIG. 1, there is shown a side view of the bar code scanning device of the present invention generally indicated by the numeral 18 comprising a support member 20 having a sloping portion 22 to which is rotatably mounted a housing member 24. The support member 20 includes an end portion 26 having a cut-out portion 28 which accommodates the handle portion 30 of a hand-held bar code optical scanner 32. The sloping portion 22 includes a recessed portion 33 to accommodate the head portion 35 of the scanner 32.

Figure 3:
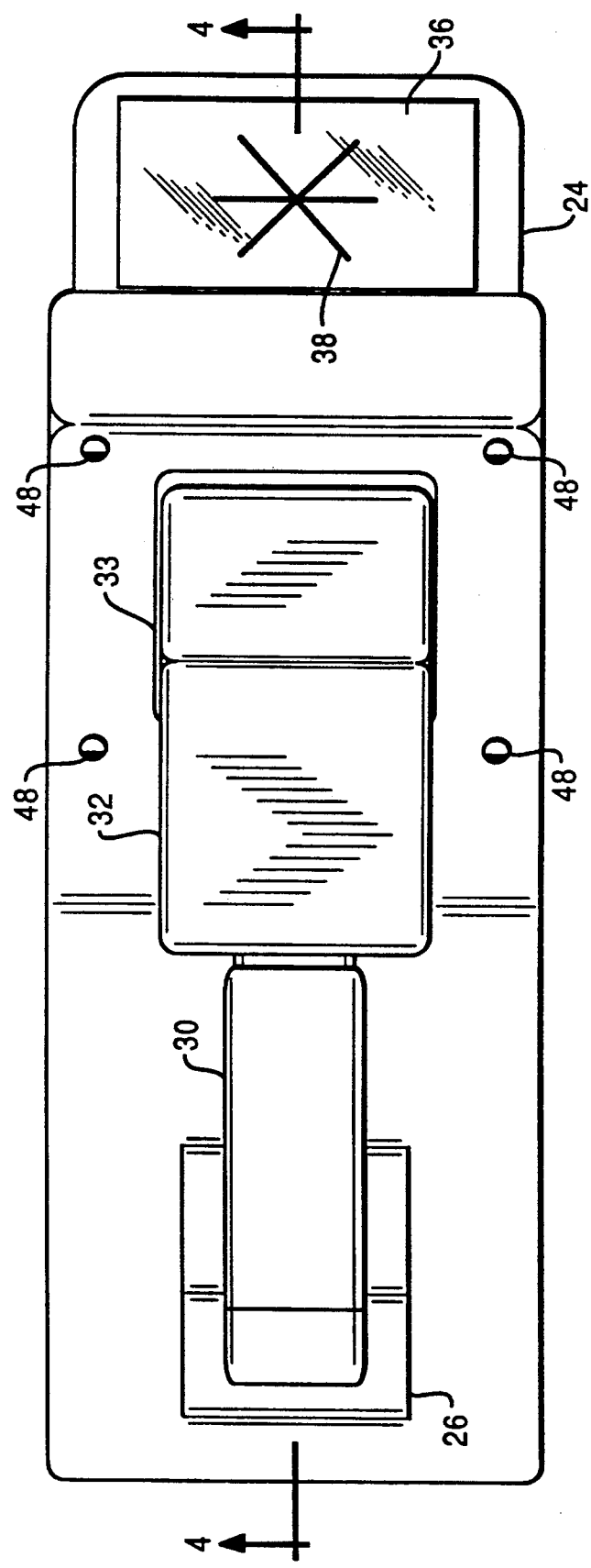
FIG. 3 is a top view of the portable bar code scanning apparatus of the present invention.
Figure 7:
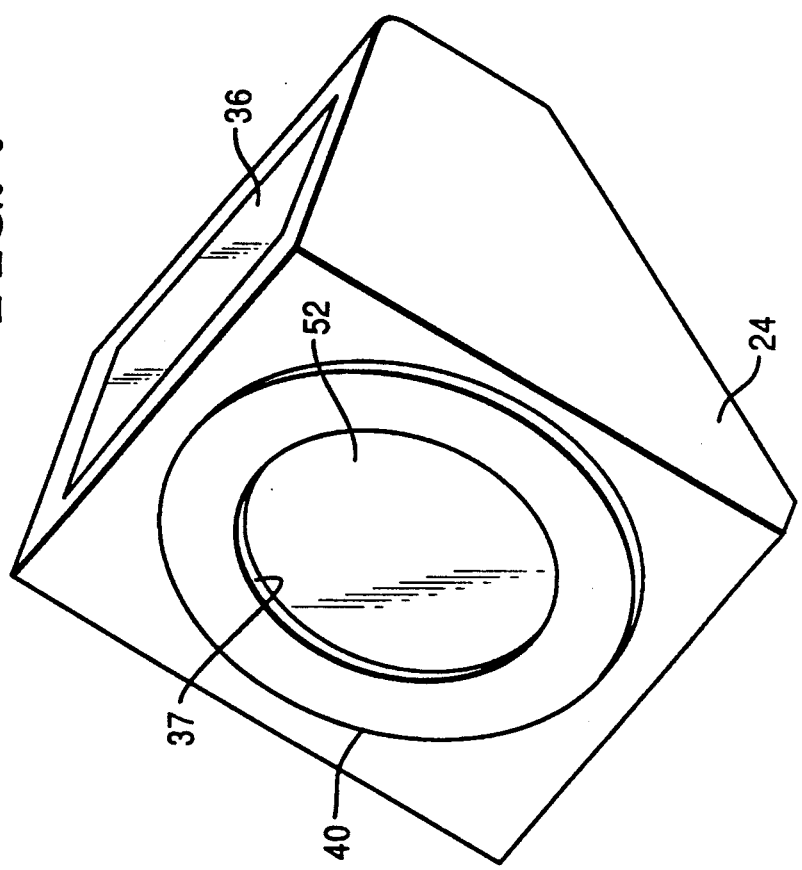
FIG. 7 is a rear right side perspective view of the housing member.
Figure 6:
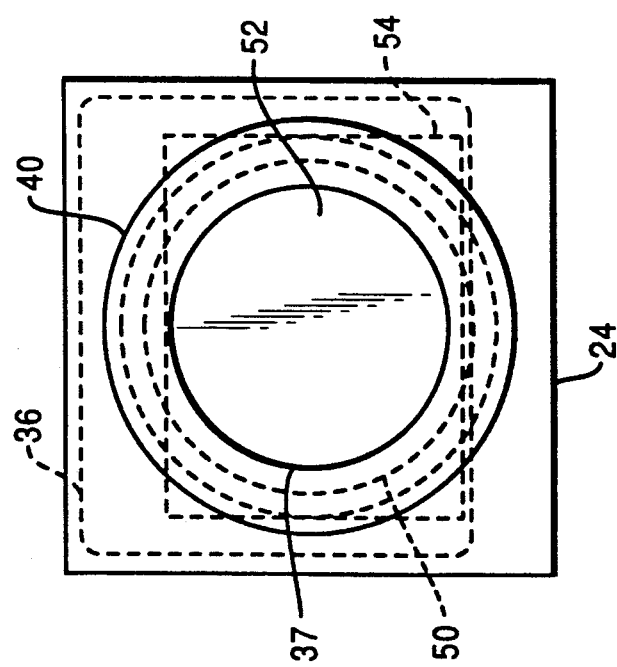
FIG. 6 is an end view of the housing member taken on line 6—6 of FIG. 5.

The housing member 24 includes a sloping front surface 34 having a recessed portion 35 in which is mounted a transparent exit substrate 36 on which is projected a scanning pattern 38 (FIG. 3) generated by the bar code scanner 32. The front surface is inclined in an upward direction. The housing member 24 further includes a rear circular flange bearing portion 40 portion (FIG. 5) which is rotatably mounted within the circular recessed portion 42 (FIG. 5) of a collar member 44. The collar member 44 is secured to the lower surface 46 of the support member 20 by any type of fastening means such as screw members 48 (FIG. 4). The bearing portion 40 further includes a recessed portion 50 (FIGS. 4-6 inclusive) within which is mounted a sealed transparent entrance substrate 52 such as a glass window.

Mounted on the floor of the housing member 24 is a mirror member 54 (FIG. 4) which reflects scanning light beams generated by the hand-held scanner 32 along a beam axis 56. The scanning light beams in the form of the scanning pattern 38 (FIG. 3) are reflected from the mirror member 54 to be focused on the surface of the transparent exit substrate 36 enabling the operator to position the bar code label which is to be scanned adjacent the scanning pattern. The substrate 36 is preferably constructed of a transparent material such as water white glass which will display the multi-line scanning pattern 38 projected by the bar code scanner 32 enabling the operator to easily align the bar code label on the scanning pattern. Reference may be directed to the previously cited NCR patent application Ser. No. 625,331 for a complete disclosure of the support member 20 and housing member 24, which disclosure is entirely incorporated herein by reference.

In the operation of the bar code scanning device 18, the operator will mount the handle portion 30 of the hand-held scanner 32 within the cutout portion 28 (FIG. 1) of the support member 20. The operator will then position the front face portion 32 (FIG. 4) of the scanner 34 on a plastic insert 31 mounted adjacent an aperture 37 (FIGS. 4-7 inclusive) in the collar member 44 adjacent the recessed portion 33 in the support member 20, and will turn on the scanner. This projects the scanning light beams forming the scanning pattern 38 along the beam axis 56 (FIGS. 1 and 4) which is projected through the entrance substrate 52 onto the reflecting mirror member 54 from where the light beams are focused on the exit substrate 36. In scanning a bar code label, the label is positioned on the surface of the substrate 36 and moved across the scan pattern 38 for reading the bar code label in a manner that is well known in the art. Where the space at the checkout station prevents the scanning of the bar code label with the housing member 24 orientated as shown in FIG. 1, the operator will rotate the housing member through any angle up to one hundred and eighty degrees to facilitate the scanning of the bar code label. While there has been disclosed the use of the substrates 36 and 52, it is obvious the scanning device of the present invention will still operate for its intended purpose if the substrates are not incorporated into the structure.

It will be seen from this construction that a checkout operator can adjust the position of the housing member to conveniently move the bar code label past the scanning device utilizing both hands to grasp the article on which the bar code label is attached.

Although the preferred embodiment of the present invention has been described herein, it is not intended that the invention be restricted thereto, but that it be limited only by the true spirit and scope of the appended claims.

What is claimed is:

1. A structure associated with a source of scanning light beams comprising:
   a support means for supporting the source of scanning light beams; and
   a housing member rotatably mounted on said support means, said housing member including a scanning aperture in communication with the source of scanning light beams and through which the scanning light beams are projected for scanning a coded indicia positioned adjacent said aperture, said housing member being rotated to position said aperture in a plurality of scanning positions.

2. The structure of claim 1 in which said support means includes an aperture which is in communication with said scanning aperture, said support means supporting the source of scanning light beams adjacent the aperture enabling the source to project the scanning light beams through said scanning aperture.

3. The structure of claim 1 which further includes optical means mounted in said support means and in communication with said aperture and said scanning aperture for transmitting the scanning light beams from the source to the scanning aperture.

4. The structure of claim 1 in which the source of scanning light beams comprises a portable hand-held optical scanner.

5. A structure associated with a portable optical scanner for converting the hand-held scanner to a fixed mount hands-free contact scanning apparatus comprising;
   a portable support member having a supporting surface for supporting the portable scanner; and
   a housing member rotatably mounted on said support member and including a scanning surface in communication with with said supporting surface through which scanning light beams from the portable scanner are projected for scanning a coded label positioned adjacent the scanning surface, said housing member being rotated for positioning the scanning surface in a plurality of scanning positions.

6. The structure of claim 5 further including optical means mounted in said housing member and in communication with said supporting surface and said scanning surface for transmitting the scanning light beams from the portable scanner to the scanning surface.

7. The structure of claim 6 in which said optical means comprises a mirror member mounted at forty five degrees to the supporting surface and the scanning surface for deflecting the scanning light beams outputted by the scanner through the scanning surface.

8. A scanning system for scanning coded symbols comprising;
   an elongated support member;
   a housing member rotatably mounted to said support member having a first supporting surface oriented in a first direction;
   a second supporting surface oriented at a first angle to the first supporting surface;
   a mirror member mounted on said second supporting surface;
   a third supporting surface oriented at an angle to said first and second supporting surfaces;
   a transparent substrate mounted in said third supporting surface;
   and a source of scanning light beams mounted on said support member adjacent said first supporting surface for projecting light beams in a direction towards said mirror member which reflects the scanning light beams at said transparent substrate for scanning coded symbols positioned adjacent the transparent substrate.

9. The scanning system of claim 8 which includes a second transparent substrate mounted in said first supporting surface for transmitting the scanning light beams projected from the source of scanning light beams.

10. The scanning system of claim 8 in which said third supporting surface is orientated at an angle of approximately ninety degrees to said first supporting surface.

11. The scanning apparatus of claim 10 in which the second supporting surface is oriented at an angle of approximately forty-five degrees to both the first and third supporting surfaces.

12. The scanning apparatus of claim 8 in which the source of scanning light beams comprises a hand-held scanning unit.

13. The scanning apparatus of claim 12 in which the support member includes a rear extension portion having a first recessed portion for supporting one end of the hand-held scanning unit, said support member further including a second recessed portion within which the operating end of the hand held scanning unit is positioned thereby locating the scanner adjacent the first supporting surface.

14. The scanning apparatus of claim 13 in which the first transparent substrate comprises a water white glass window and the second substrate comprises a glass window.

15. The scanning apparatus of claim 8 in which said support member includes a recessed socket portion and said housing member includes a bearing surface mounted within said socket portion enabling said housing member to be rotated on said support member.

* * * * *